US012738689B2

(12) United States Patent
Reedy et al.

(10) Patent No.: US 12,738,689 B2
(45) Date of Patent: Sep. 15, 2026

(54) VIBRATION RESISTANT CONNECTOR SYSTEM WITH MATING ASSISTANCE FEATURE

(71) Applicant: Aptiv Technologies AG, Schaffhausen (CH)

(72) Inventors: Patrick J. Reedy, Youngstown, OH (US); Don E. Bizon, Youngstown, OH (US); William C. Lovitz, Niles, OH (US); Nicholas A. Durse, Youngstown, OH (US)

(73) Assignee: Aptiv Technologies AG, Schaffhausen (CH)

(*) Notice: Subject to any disclaimer, the term of this patent is extended or adjusted under 35 U.S.C. 154(b) by 828 days.

(21) Appl. No.: 18/127,942

(22) Filed: Mar. 29, 2023

(65) Prior Publication Data

US 2023/0327374 A1 Oct. 12, 2023

Related U.S. Application Data

(60) Provisional application No. 63/328,219, filed on Apr. 6, 2022.

(51) Int. Cl.
*H01R 13/629* (2006.01)
*H01R 13/512* (2006.01)
*H01R 43/20* (2006.01)

(52) U.S. Cl.
CPC ..... *H01R 13/62933* (2013.01); *H01R 13/512* (2013.01); *H01R 43/20* (2013.01); *H01R 2201/26* (2013.01)

(58) Field of Classification Search
CPC ............ H01R 13/62933; H01R 13/512; H01R 43/20; H01R 2201/26; H01R 13/6215; H01R 13/62938; H01R 13/533; H01R 13/6271; H01R 13/62927; H01R 13/436; H01R 13/639; H01R 43/26
See application file for complete search history.

(56) References Cited

U.S. PATENT DOCUMENTS 4,869,681 A * 9/1989 Vache .................. H05K 7/1461 439/930
5,273,453 A 12/1993 Manassero et al.
(Continued)

FOREIGN PATENT DOCUMENTS

JP 2006092776 A 4/2006

OTHER PUBLICATIONS

"Extended European Search Report", European Patent Office, mailed on Aug. 22, 23, 15 Pages.

*Primary Examiner* — Edwin A. Leon
(74) *Attorney, Agent, or Firm* — Billion & Armitage

(57) ABSTRACT

An connector assembly includes a connector header configured to be attached to a mounting substrate by a first mounting stud extending through a first aperture defined by the connector header, a connector configured to mate and unmate with the connector header and having a mating assist lever configured to attach and detach the connector to and from the connector header, and a mounting tab defined by the connector and configured to attach the connector to the first mounting stud extending through a second aperture defined by the mounting tab. Methods of assembling such a connector assembly are also provided.

19 Claims, 9 Drawing Sheets

(56) References Cited

U.S. PATENT DOCUMENTS

| | | | | |
|---|---|---|---|---|
| 8,882,532 | B1 * | 11/2014 | Akiyama | H01R 13/62977 439/372 |
| 9,583,875 | B2 | 2/2017 | Griepenstroh | |
| 9,608,357 | B1 * | 3/2017 | Sundarakrishnamachari | H01R 13/62977 |
| 9,824,837 | B2 * | 11/2017 | Ooishi | H01R 13/62938 |
| 9,843,118 | B1 * | 12/2017 | Tanaka | H01R 13/648 |
| 9,960,538 | B2 * | 5/2018 | Nagasaki | H01R 13/639 |
| 10,270,205 | B2 * | 4/2019 | Nishio | H01R 13/62938 |
| 11,291,115 | B2 * | 3/2022 | Ferguson | H05K 1/181 |
| 11,404,822 | B2 * | 8/2022 | Motoshige | H01R 13/641 |
| 2001/0051469 | A1 * | 12/2001 | Murakami | H01R 11/287 439/755 |
| 2014/0295686 | A1 * | 10/2014 | Ohnuki | H01R 13/62938 439/157 |
| 2018/0254583 | A1 | 9/2018 | Williams | |
| 2018/0259731 | A1 * | 9/2018 | Dupeux | G02B 6/4271 |
| 2019/0312394 | A1 | 10/2019 | Paynter et al. | |
| 2022/0043026 | A1 * | 2/2022 | Ueyama | H05K 5/03 |

* cited by examiner

VIBRATION RESISTANT CONNECTOR SYSTEM WITH MATING ASSISTANCE FEATURE

CROSS-REFERENCE TO RELATED APPLICATION

This application claims benefit of priority to U.S. Provisional Application No. 63/328,219 filed on Apr. 6, 2022, the entire disclosure of which is hereby incorporated by reference.

TECHNICAL FIELD OF THE INVENTION

This disclosure is directed to a vibration resistant connector system with a mating assistance feature, e.g., automotive electrical connector assemblies.

BACKGROUND

Conventional lever-based connector mating assist systems provide a means to meet connector mating ergonomic requirements without the need for special tools or assembly fixtures. However, these conventional lever-based connector mating assist systems are not well suited for applications in which higher levels of vibration are experienced by the connector system due to relative motion between the male and female connectors of the connector system. Therefore, a connector mating system that does not require special tools or fixtures and that is suited for use in higher vibration applications remains desired.

SUMMARY

According to one or more aspects of the present disclosure, a connector assembly includes a connector header configured to be attached to a mounting substrate by a first mounting stud extending through a first aperture defined by the connector header, a connector configured to mate and unmate with the connector header and having a mating assist lever configured to attach and detach the connector to and from the connector header, and a mounting tab defined by the connector and configured to attach the connector to the first mounting stud extending through a second aperture defined by the mounting tab.

In some aspects of the connector assembly according to the previous paragraph, the mounting tab is integrally formed with the connector.

In some aspects of the connector assembly according to any one of the previous paragraphs, the first mounting stud is threaded. The connector header is secured to the first mounting stud by a first threaded nut and the mounting tab is secured to the first nut by a second threaded nut.

In some aspects of the connector assembly according to any one of the previous paragraphs, the first nut is integrally formed with the first stud.

In some aspects of the connector assembly according to any one of the previous paragraphs, the mounting tab is a first mounting tab. The connector header is configured to be attached to the mounting substrate by a second mounting stud that extends through a third aperture defined by the connector header. The mating assist lever defines a second mounting tab that is configured to attach the mating assist lever to the second mounting stud which extends through a fourth aperture defined by the second mounting tab.

In some aspects of the connector assembly according to any one of the previous paragraphs, the second mounting stud is threaded. The connector header is secured to the second mounting stud by a third threaded nut and the second mounting tab is secured to the second mounting stud by a fourth threaded nut.

In some aspects of the connector assembly according to any one of the previous paragraphs, the third nut is integrally formed with the second stud.

In some aspects of the connector assembly according to any one of the previous paragraphs, the first mounting stud is arranged diagonally with the second mounting stud.

In some aspects of the connector assembly according to any one of the previous paragraphs, the mounting tab is integrally formed with the mating assist lever.

According to one or more aspects of the present disclosure, a method of assembling an electrical connector includes the steps of: inserting a first mounting stud extending from a mounting substrate through a first aperture defined by a connector header, placing a first nut on the first mounting stud and securing the connector header to the mounting substrate, inserting the first mounting stud through a second aperture of a mounting tab defined by a connector configured to mate and unmate with the connector header which has a mating assist lever configured to attach and detach the connector to and from the connector header, activating the mating assist lever to attach the connector to the connector header, and placing a second nut on the first mounting stud and securing the mounting tab to the first nut.

In some aspects of the method according to the previous paragraph, the mounting tab is integrally formed with the connector.

In some aspects of the method according to the previous paragraph, the first mounting stud is threaded.

In some aspects of the method according to the previous paragraph, the first nut is integrally formed with the first stud.

In some aspects of the method according to any one of the previous paragraphs, the mounting tab is a first mounting tab. The method includes the additional steps of: inserting a second mounting stud extending from the mounting substrate through a third aperture defined by a connector header, placing a third nut on the second mounting stud and further securing the connector header to the mounting substrate, inserting the second mounting stud through a fourth aperture of a second mounting tab defined by the mating assist lever, and placing a fourth nut on the second mounting stud and securing the second mounting tab to the third nut.

In some aspects of the method according to any one of the previous paragraphs, the second mounting stud is threaded.

In some aspects of the method according to any one of the previous paragraphs, the third nut is integrally formed with the first stud.

In some aspects of the method according to any one of the previous paragraphs, the first mounting stud is arranged diagonally with the second mounting stud.

According to one or more aspects of the present disclosure, a method of assembling an electrical connector includes the steps of: inserting a first mounting stud extending from a mounting substrate through a first aperture defined by a connector header, placing a first nut on the first mounting stud and securing the connector header to the mounting substrate, inserting the first mounting stud through a second aperture of a mounting tab defined by a mating assist lever configured to attach and detach a connector to and from the connector header, activating the mating assist lever to attach the connector to the connector header, and placing a second nut on the first mounting stud and securing the mounting tab to the first nut.

In some aspects of the method according to the previous paragraph, the mounting tab is integrally formed with the mating assist lever.

In some aspects of the method according to any one of the previous paragraphs, the first mounting stud is threaded, and the first nut is integrally formed with the mounting stud.

BRIEF DESCRIPTION OF THE DRAWINGS

The present invention will now be described by way of example with reference to the accompanying drawings, in which.

In the following description, similar features of the various embodiments share the last two digits of the reference numbers shown in the figures.

DETAILED DESCRIPTION

Figure 1:
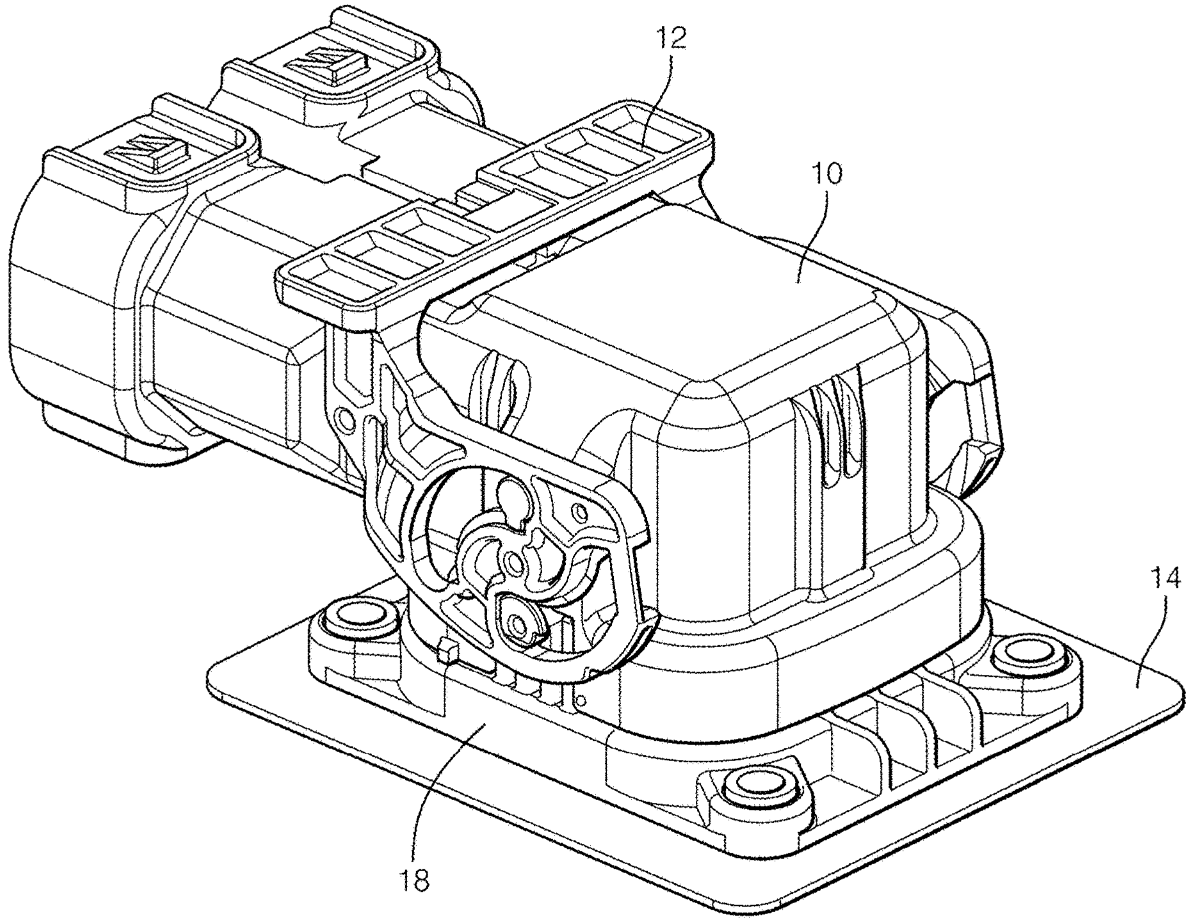
PRIOR ART FIG. 1
FIG. 1 illustrates a perspective view of an electrical connector with a lever-based connector mating assist system according to the prior art.

Conventional electrical connectors 10 having a connection assist lever 12, such as the example shown in FIG. 1, provide ease of mating without the need for additional tools. Mechanical fastening of the electrical connector 10 to a mounting substrate 14 is provided by the interface connection of the assist lever 12 of the electrical connector 10 to a connector header 18 and the connection of the connector header 18 to the mounting substrate 14. The type of electrical connector 10 shown in FIG. 1 may be suitable for applications that experience lower levels of vibration. Since there are two separate connections between the mounting substrate 14 and the electrical connector 10, i.e., the connection between the mounting substrate 14 and the connector header 18; and connection between the connector header 18 and the electrical connector 10, there are also two points at which vibration may enter the connection system.

The non-limiting example of an electrical connector assembly 100 with a lever-based connector mating assist system that is shown in FIGS. 2 through 8B is designed to resist vibration that may enter the connection system by mechanically fixing an electrical connector 110 to the mounting substrate 114 after the electrical connector 110 and connector header 118 are mated using the assist lever 112. A mounting stud 120 which attains this mechanical fixation extends from the mounting substrate 114 and through the connector header 118. One end of this mounting stud 120 is received within a hole 122 through a mounting tab 124 that projects from the electrical connector 110.

Figure 2:
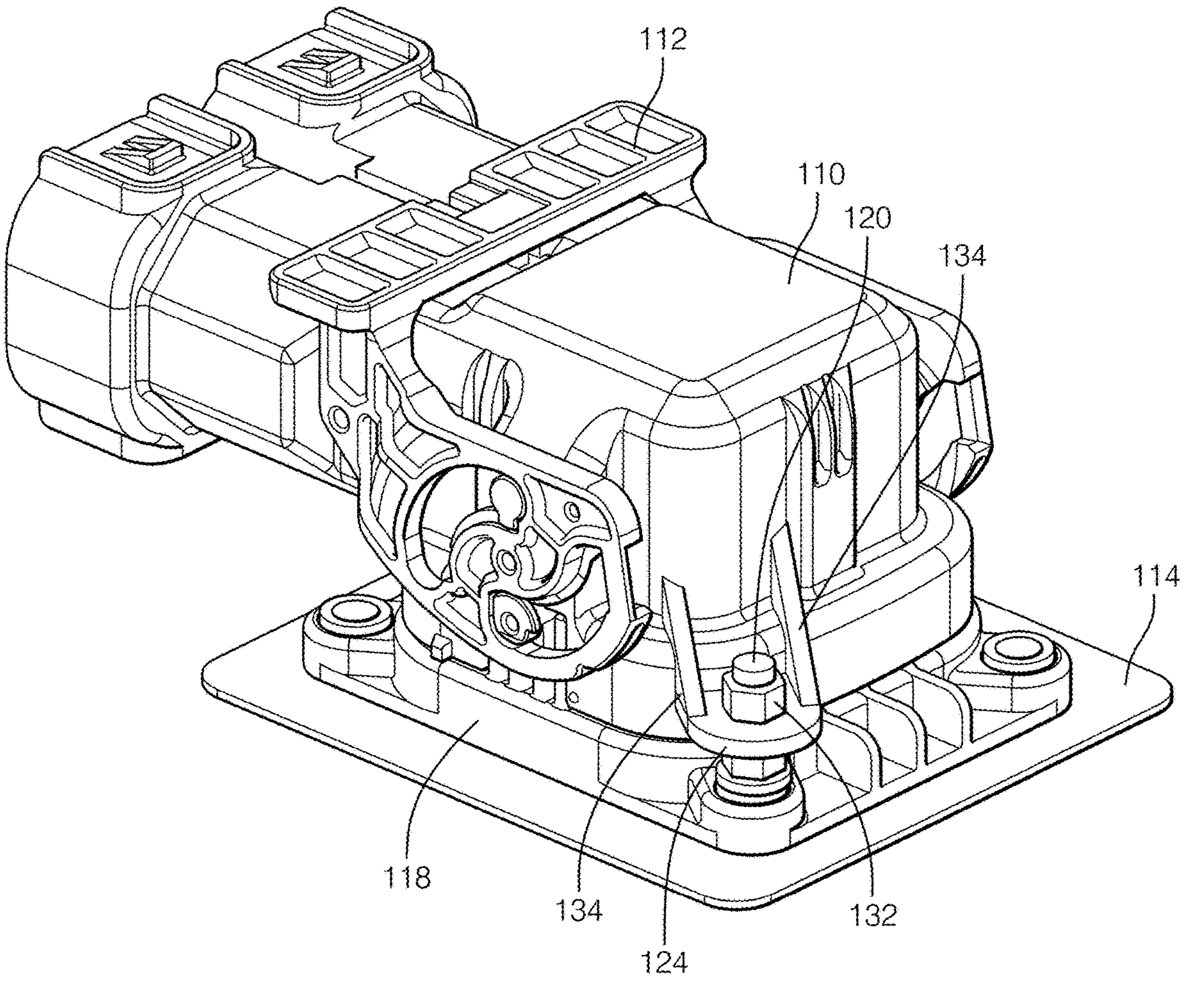
FIG. 2 illustrates a perspective view of an electrical connector with a lever-based connector mating assist system according to some embodiments.
Figure 3:
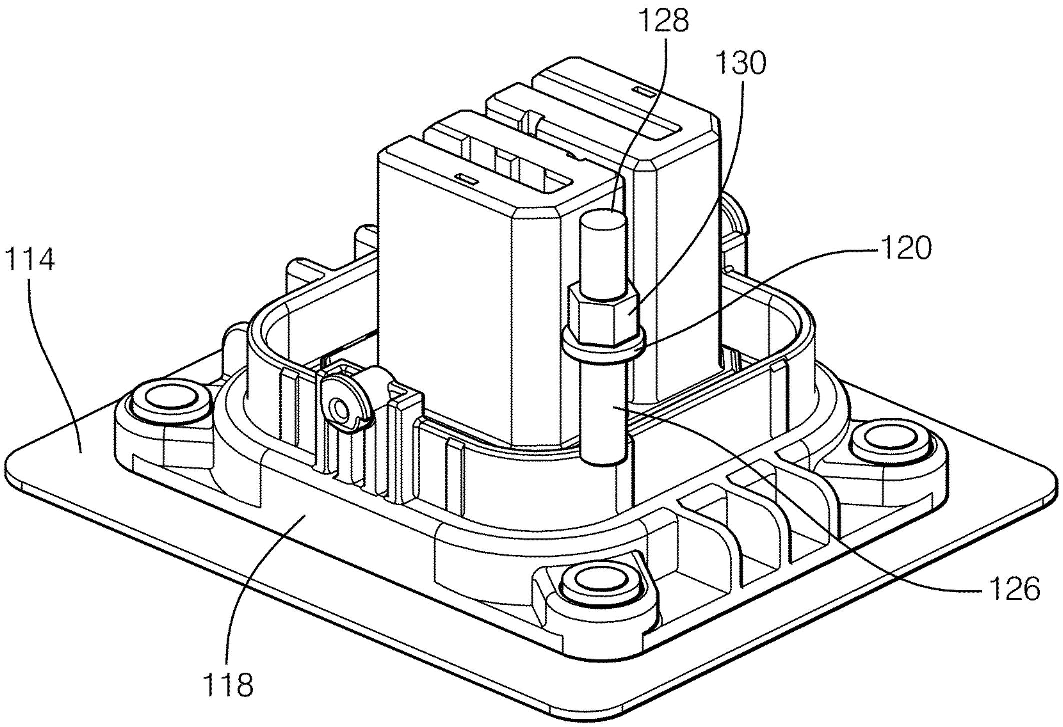
FIG. 3 illustrates a perspective view of a header portion of the electrical connector of FIG. 2 according to some embodiments.

As shown in FIG. 3, the mounting stud 120 is a double-ended bolt with two threaded portions 126, 128 extending from a hexagonal head, hereafter referred to as an integral first nut 130. One of the threaded portions 126 extends through the connector header 118 into the mounting substrate 114 and the other threaded portion 128 is received in the hole 122 of the mounting tab 124. As shown in FIG. 2, a second nut 132 is threaded on the second threaded portion 128 to secure the mounting tab 124 to the mounting stud 120. Preferably, the first nut 130 is sized so that there is a hard point contact between the mounting tab 124 and the first nut 130 when the second nut 132 is sufficiently tightened to secure the mounting tab 124 to the mounting stud 120. As additionally shown in FIG. 2 the mounting tab 124 may include gussets 134 between the mounting tab 124 and the housing of the electrical connector 110 to increase mechanical rigidity of the mounting tab 124.

Figure 4:
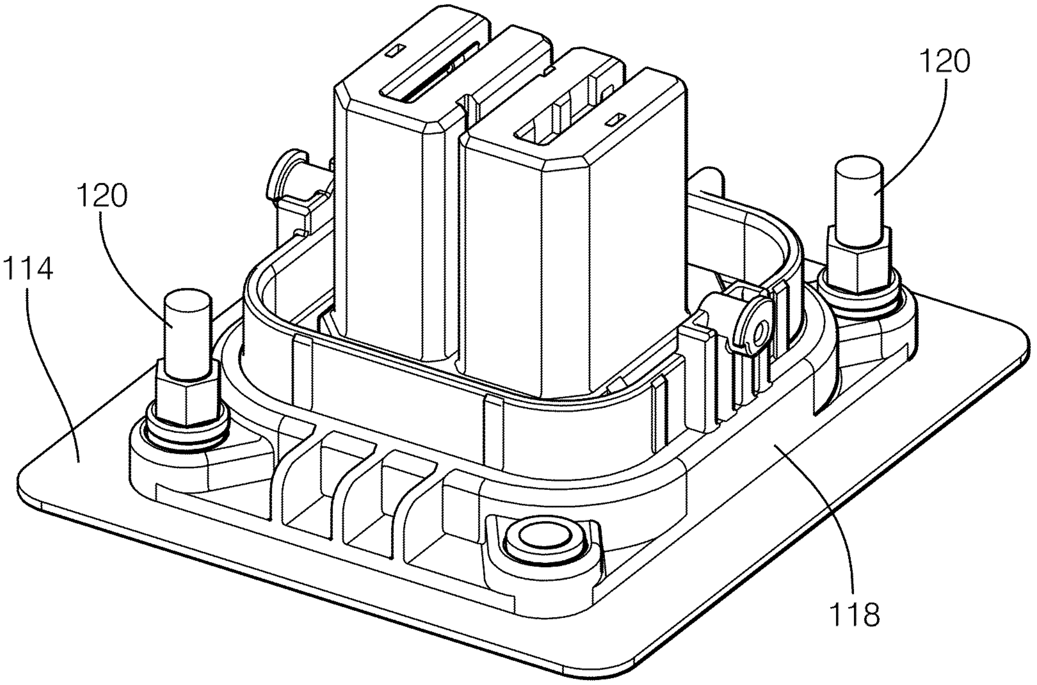
FIG. 4 illustrates an alternative perspective view of the header portion of FIG. 3 according to some embodiments.

As shown in FIG. 4, there may be more than one mounting stud 120 extending from the connector header 118 and more than one mounting tab 124 extending from the electrical connector 110 (not shown due to perspective view). It may be preferable to include two mounting studs 120 and mounting tabs 124 arranged diagonally as shown in FIG. 4 to resist vibration between the electrical connector 110/connector header 118 interface. The number of mounting studs 120 and mounting tabs 124 may be increased up to the number of mounting points for the connector header 118 to the mounting substrate 114 if desired.

Figure 5:
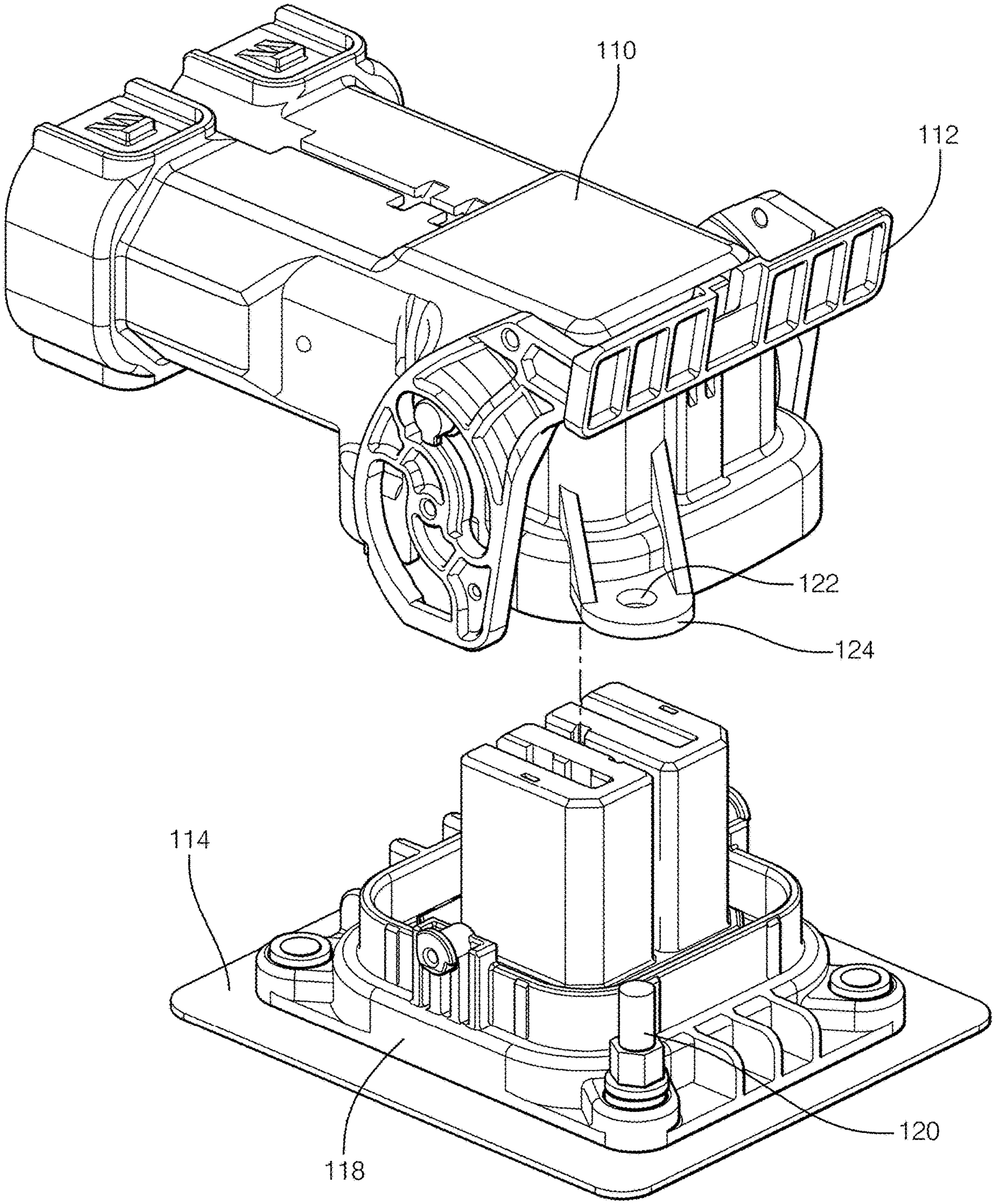
FIGS. 5 to 7 illustrate a mating sequence of the electrical connector of FIG. 2 according to some embodiments.
Figure 6:
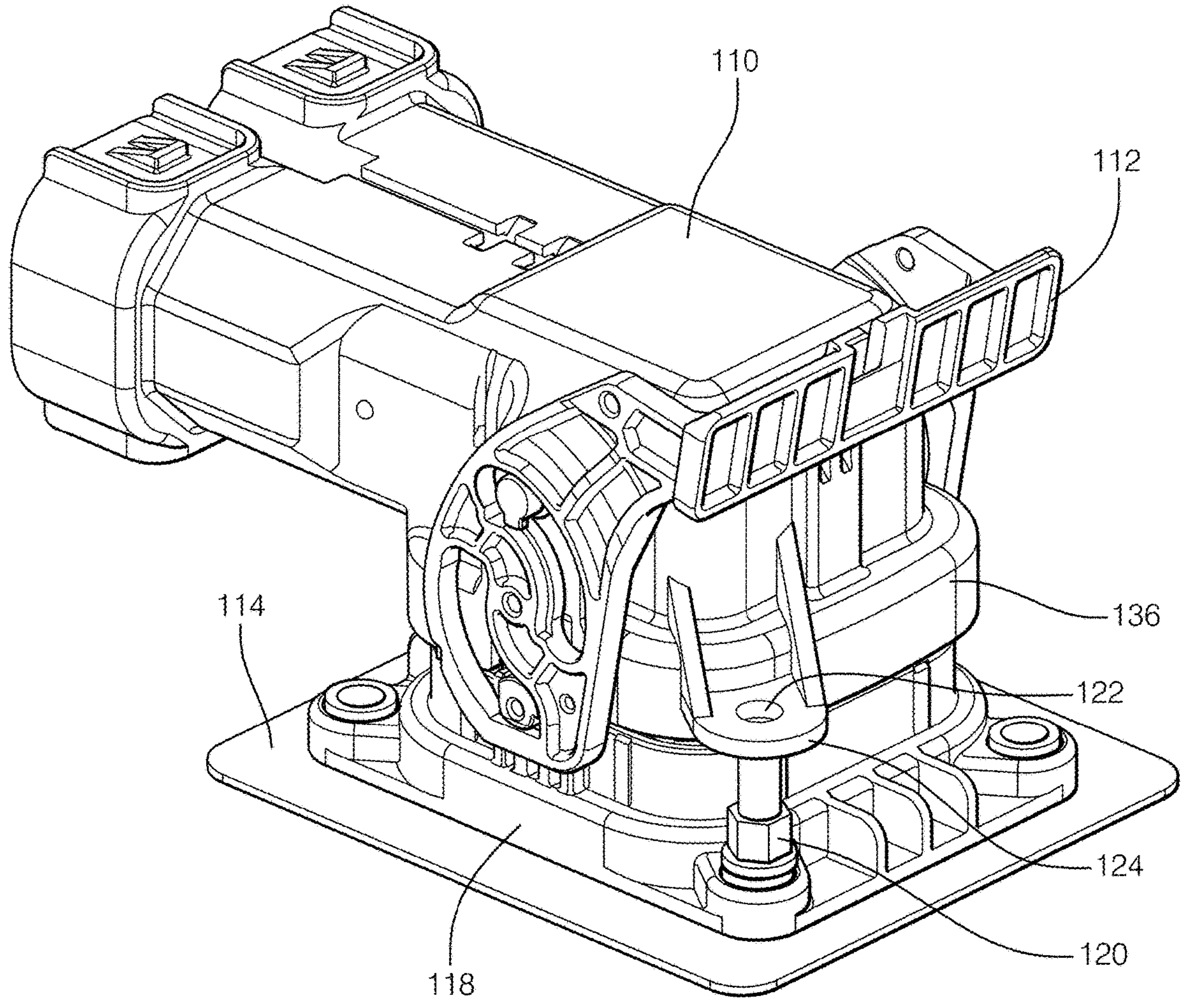
Figure 7:
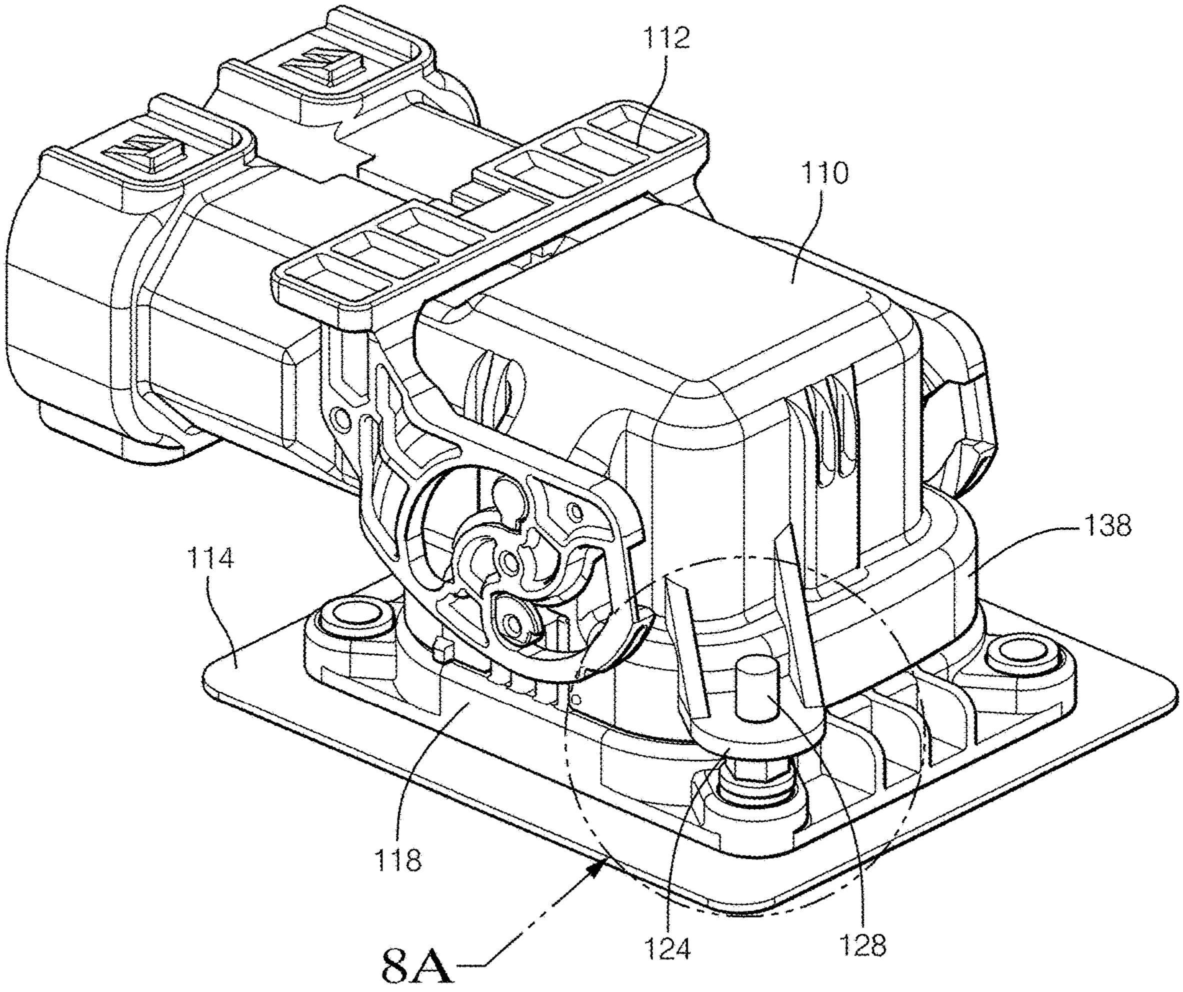
Figure 8A:
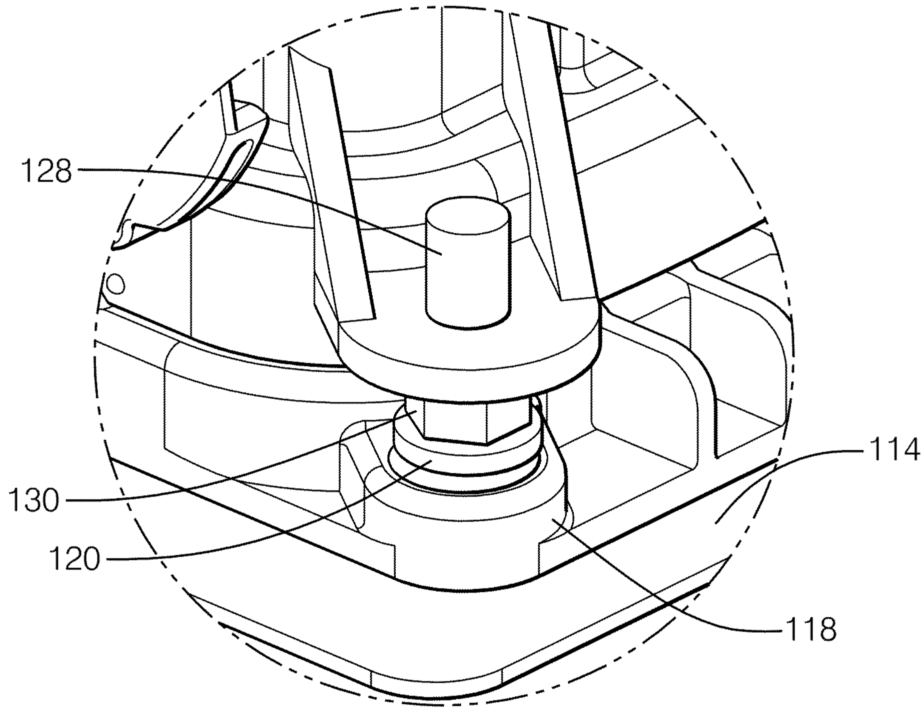
FIGS. 8A and 8B illustrate close up views of vibration resistant retaining features of the electrical connector of FIG. 2 according to some embodiments.
Figure 8B:
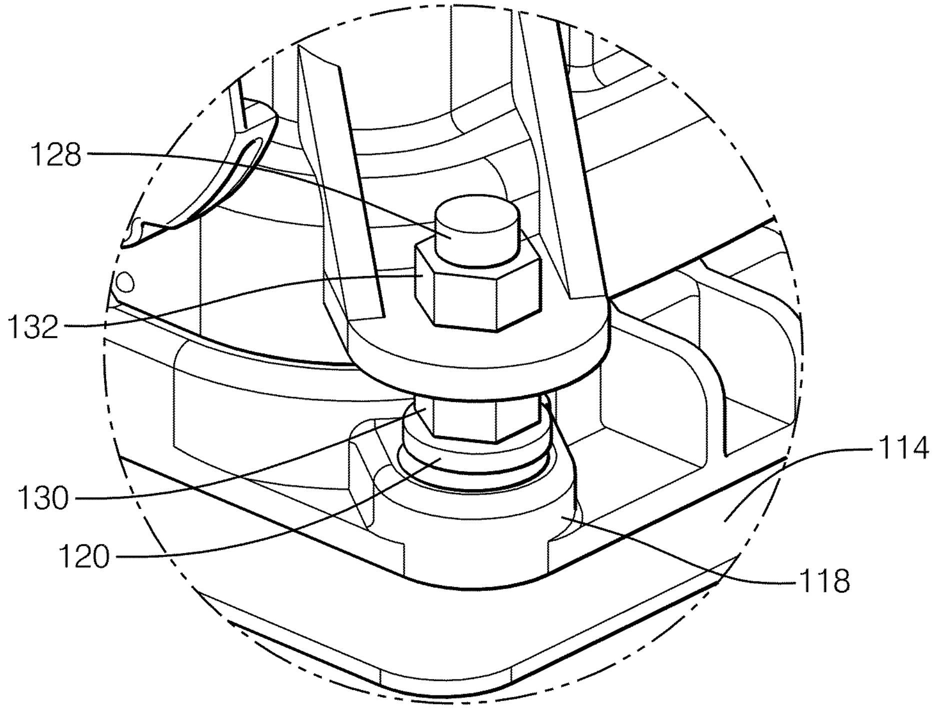

FIGS. 5 through 7 show a sequence of mating the electrical connector 110 with the connector header 118. In FIG. 5, the electrical connector 110 is properly aligned with the connector header 118 which has been previously attached to the mounting substrate 114 by the mounting stud 120 (and other fasteners, if needed). In FIG. 6, the electrical connector 110 is in a pre-staged position 136 in which the assist lever 112 is engaged with the connector header 118 in a first position. As the assist lever 112 is rotated from the first position to a second position, the electrical connector 110 is drawn from the pre-staged position 136 to a staged position 138 in which the electrical connector 110 and connector header 118 are fully mated. As can be further observed in FIG. 6, the second threaded portion 128 of the mounting stud 120 is received within the hole 122 in the mounting tab 124 as the electrical connector 110 moves from the pre-staged position 136 to the staged position 138 as shown in FIG. 8A. The second nut 132 may then be threaded on the second threaded portion 128 to secure the mounting tab 124 to the mounting stud 120 as shown in FIG. 8B.

Figure 9:
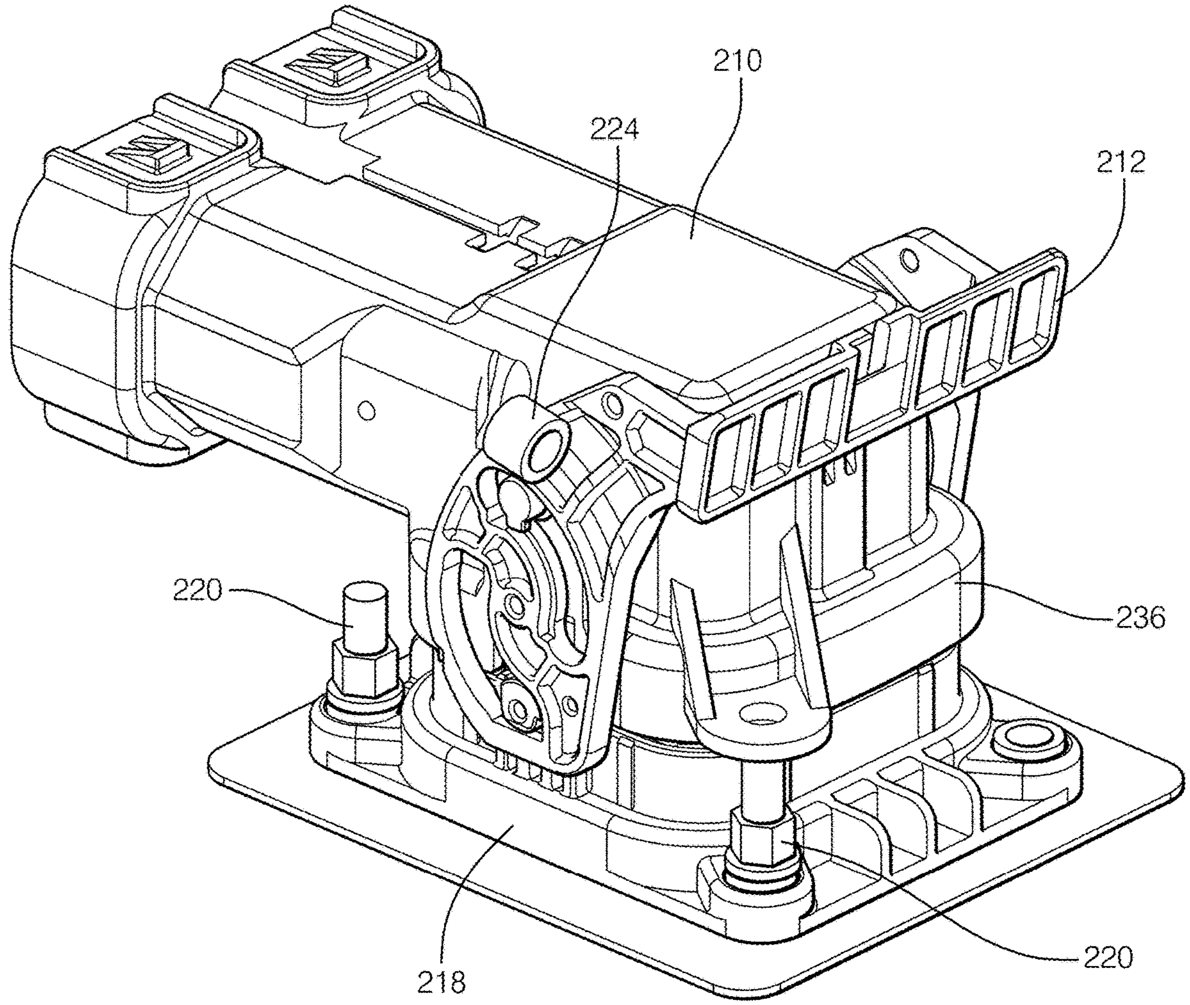
FIG. 9 illustrates a perspective view an electrical connector in a pre-staged condition according to some embodiments.
Figure 10:
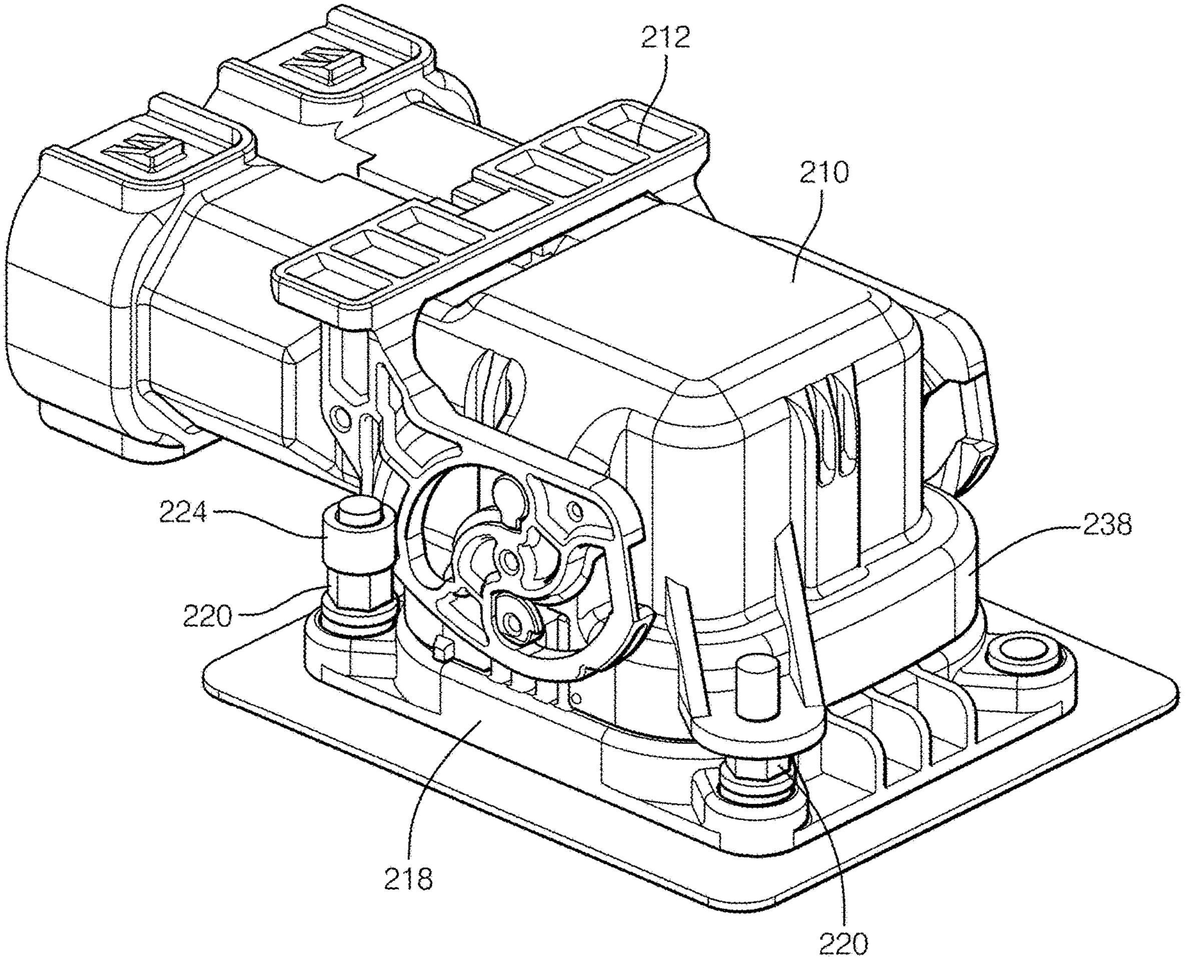
FIG. 10 illustrates a perspective view of the electrical connector of FIG. 9 in a staged condition according to some embodiments.

In another embodiment of the electrical connector, hereafter referred to as electrical connector 210, that is illustrated in FIGS. 9 and 10, the mounting tab 224 extends from the assist lever 212 rather than the housing of the electrical connector 210. In this embodiment, the second threaded portion of the mounting stud 220 is received within a hole in the mounting tab 224 as the assist lever 212 is rotated from the first position to the second position and the electrical connector 210 is moved from its pre-staged position 236 to its staged position 238. The mounting tab 224 is then held in place by a second nut 232. This embodiment has the advantage of inhibiting movement of the assist lever 212 from the second position back to the first position thereby preventing disconnection of the electrical connector 210 from the connector header 218 before the second nut 232 is removed from the mounting stud 220.

Other embodiments of the electrical connector may be envisioned that include the mounting tab shown in FIGS. 2-8B and along with the mounting tab shown in FIGS. 9-10.

While the assemblies 110, 210 shown herein are configured for use in higher vibration applications, the same assemblies 110, 210 may also be used in lower vibration applications using a single ended bolt rather than a double ended bolt and omitting the second nut. This provides an economical solution since one type of electrical connector 110, 210 and connector header 118, 218 may be used in both low and high vibration applications, thereby reducing the number of different connector designs that need to be manufactured and inventoried. The additional cost of having an unused mounting tab in lower vibration applications is negligible, since the cost involves only a small amount of additional housing or lever material.

While the examples presented herein is directed to electrical connector assemblies, alternative embodiments of the connector assembly may be envisioned that are configured to interconnect fiber optic cables, pneumatic tubes, hydraulic tubes, or a hybrid connector assembly having a combination of any of these types of conductors.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context cltably indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector assembly, comprising:

a connector header configured to be attached to a mounting substrate by a threaded first mounting stud extending through a first aperture defined by the connector header, the connector header being secured to the first mounting stud by a first threaded nut;

a connector configured to mate and unmate with the connector header, the connector comprises a mating assist lever configured to attach and detach the connector to and from the connector header; and a mounting tab defined by the connector and configured to attach the connector to the first mounting stud extending through a second aperture defined by the mounting tab, the mounting tab being secured to the first nut by a second threaded nut.

2. The connector assembly according to claim 1, wherein the mounting tab is integrally formed with the connector.

3. The connector assembly according to claim 1, wherein the first nut is integrally formed with the first stud.

4. The connector assembly according to claim 1, wherein the mounting tab is a first mounting tab, wherein the connector header is configured to be attached to the mounting substrate by a second mounting stud extending through a third aperture defined by the connector header, and wherein the mating assist lever defines a second mounting tab configured to attach the mating assist lever to the second mounting stud extending through a fourth aperture defined by the second mounting tab.

5. The connector assembly according to claim 4, wherein the second mounting stud is threaded and wherein the connector header is secured to the second mounting stud by a third threaded nut, and the second mounting tab is secured to the second mounting stud by a fourth threaded nut.

6. The connector assembly according to claim 5, wherein the third nut is integrally formed with the second stud.

7. The connector assembly according to claim 4, wherein the first mounting stud is arranged diagonally with the second mounting stud.

8. The connector assembly according to claim 1, wherein the mounting tab is integrally formed with the mating assist lever.

9. A method of assembling an electrical connector, comprising:

inserting a first mounting stud extending from a mounting substrate through a first aperture defined by a connector header;

placing a first nut on the first mounting stud and securing the connector header to the mounting substrate;

inserting the first mounting stud through a second aperture of a mounting tab defined by a connector configured to mate and unmate with the connector header which has a mating assist lever configured to attach and detach the connector to and from the connector header;

activating the mating assist lever to attach the connector to the connector header; and placing a second nut on the first mounting stud and securing the mounting tab to the first nut.

10. The method according to claim 9, wherein the mounting tab is integrally formed with the connector.

11. The method according to claim 9, wherein the first mounting stud is threaded.

12. The method according to claim 11, wherein the first nut is integrally formed with the first stud.

13. The method according to claim 10, wherein the mounting tab is a first mounting tab, wherein the method further comprises:

inserting a second mounting stud extending from the mounting substrate through a third aperture defined by a connector header;

placing a third nut on the second mounting stud and further securing the connector header to the mounting substrate;

inserting the second mounting stud through a fourth aperture of a second mounting tab defined by the mating assist lever; and placing a fourth nut on the second mounting stud and securing the second mounting tab to the third nut.

14. The method according to claim 13, wherein the second mounting stud is threaded.

15. The method according to claim 14, wherein the first nut is integrally formed with the first stud.

16. The method according to claim 13, wherein the first mounting stud is arranged diagonally with the second mounting stud.

17. A method of assembling an electrical connector, comprising:

inserting a first mounting stud extending from a mounting substrate through a first aperture defined by a connector header;

placing a first nut on the first mounting stud and securing the connector header to the mounting substrate;

inserting the first mounting stud through a second aperture of a mounting tab defined by a mating assist lever configured to attach and detach a connector to and from the connector header;

activating the mating assist lever to attach the connector to the connector header; and placing a second nut on the first mounting stud and securing the mounting tab to the first nut.

18. The method according to claim 17, wherein the mounting tab is integrally formed with the mating assist lever.

19. The method according to claim 17, wherein the first mounting stud is threaded, and the first nut is integrally formed with the mounting stud.

* * * * *